United States Patent [19]

Ishii

[11] Patent Number: 4,539,487
[45] Date of Patent: Sep. 3, 1985

[54] POWER SUPPLY SYSTEM

[75] Inventor: Tetsuo Ishii, Hyogo, Japan

[73] Assignee: Mitsubishi Denki Kabushiki Kaisha, Tokyo, Japan

[21] Appl. No.: 528,422

[22] Filed: Sep. 1, 1983

[30] Foreign Application Priority Data

Nov. 26, 1982 [JP] Japan ................................. 57-208215

[51] Int. Cl.³ .............................................. H02J 1/10
[52] U.S. Cl. ........................................ 307/44; 307/19; 307/64; 340/660
[58] Field of Search ........................ 307/19, 23, 28, 43, 307/44, 64, 65, 66, 69, 75, 253; 361/88, 92; 340/660, 663; 324/500, 537

[56] References Cited

U.S. PATENT DOCUMENTS

| 3,480,789 | 11/1969 | Binckley et al. | 307/69 X |
| 3,555,290 | 1/1971 | Ellermeyer | 307/65 |
| 4,321,645 | 3/1982 | Thom et al. | 307/19 X |
| 4,403,292 | 9/1983 | Ejzak et al. | 307/19 X |

Primary Examiner—A. D. Pellinen
Assistant Examiner—Derek S. Jennings
Attorney, Agent, or Firm—Bernard, Rothwell & Brown

[57] ABSTRACT

A power supply system including a plurality of power units which supply power to loads through the common bus, wherein the number of power units connected to the bus is larger at least by one than the number of power units necessary to suffice the maximum power consumption of the load. The redundant power unit is ready to relieve a working power source unit in the event of fault. The power supply system incorporates a power monitoring unit which detects the failure of a power source unit.

3 Claims, 3 Drawing Figures

POWER SUPPLY SYSTEM

BACKGROUND OF THE INVENTION

The present invention relates to a power supply system including a plurality of power units connected to the common bus for supplying power to a plurality of electronic apparatus.

In FIG. 1, showing the conventional power system of this type, reference number 1 denotes a power unit providing a specified voltage, e.g., 5 volts, with its 5-volt output (5P) and 0-volt output (GND) connected to a 5-volt bus 6 and GND bus 8, respectively, and 2 denotes another power unit providing a specified voltage other than that of the power unit 1, e.g., 24 volts, with its 24-volt output (24P) and 0-volt output (GND) connected to a 24-volt bus 7 and GND bus 8, respectively. On the buses 6, 7 and 8, there are connected a plurality of electronic apparatus, e.g., control units 3, 4 and 5 of control system, and power is supplied to these units through the 5-volt input (5P), 24-volt input (24P) and 0-volt input (GND).

The power units 1 and 2 have contacts 1X and 2X, respectively, each of which becomes conductive when the unit operates normally. The contacts 1X and 2X are connected in series so that the output is provided at 9X when both contacts are conductive, i.e., when both power units 1 and 2 operate normally. If one of the power units fails, the output 9X goes off, and thus the operation of the power units can be verified by monitoring the output 9X.

In such conventional power system, however, if the power consumption of control units increases or the number of control units is increased, the capacity of the power units must be increased, and therefore, the power system needs to be designed for each arrangement of control units, resulting in a poor productive efficiency of the power system. In addition the conventional power system has a drawback that a failure of a power source unit can cause directly the failure of the control system.

SUMMARY OF THE INVENTION

Accordingly, it is a primary object of the present invention to provide a power system which is adaptable to the variety of loads and versatile in application.

Another object of the invention is to provide a power system which, when one of power units has failed, is capable of replacing the faulty unit without interrupting the operation of the electronic apparatus to which power is supplied.

The power system according to this invention comprises a plurality of power units connected to the common bus for supplying power to the load, and a power monitoring unit which provides a signal when all power units operate normally. The capacity of each power unit is smaller than the maximum power consumption of the load, and the total capacity of the power units is larger than the maximum power consumption of the load at least by the amount of capacity of one of the power units. In other words, at least one of the power units is redundant with regard to the maximum power consumption of the load. Accordingly, when one of the power units has failed, power is supplied to the load uninterruptedly by the remaining normal power unit(s).

DESCRIPTION OF THE PREFERRED EMBODIMENT

Figure 2:
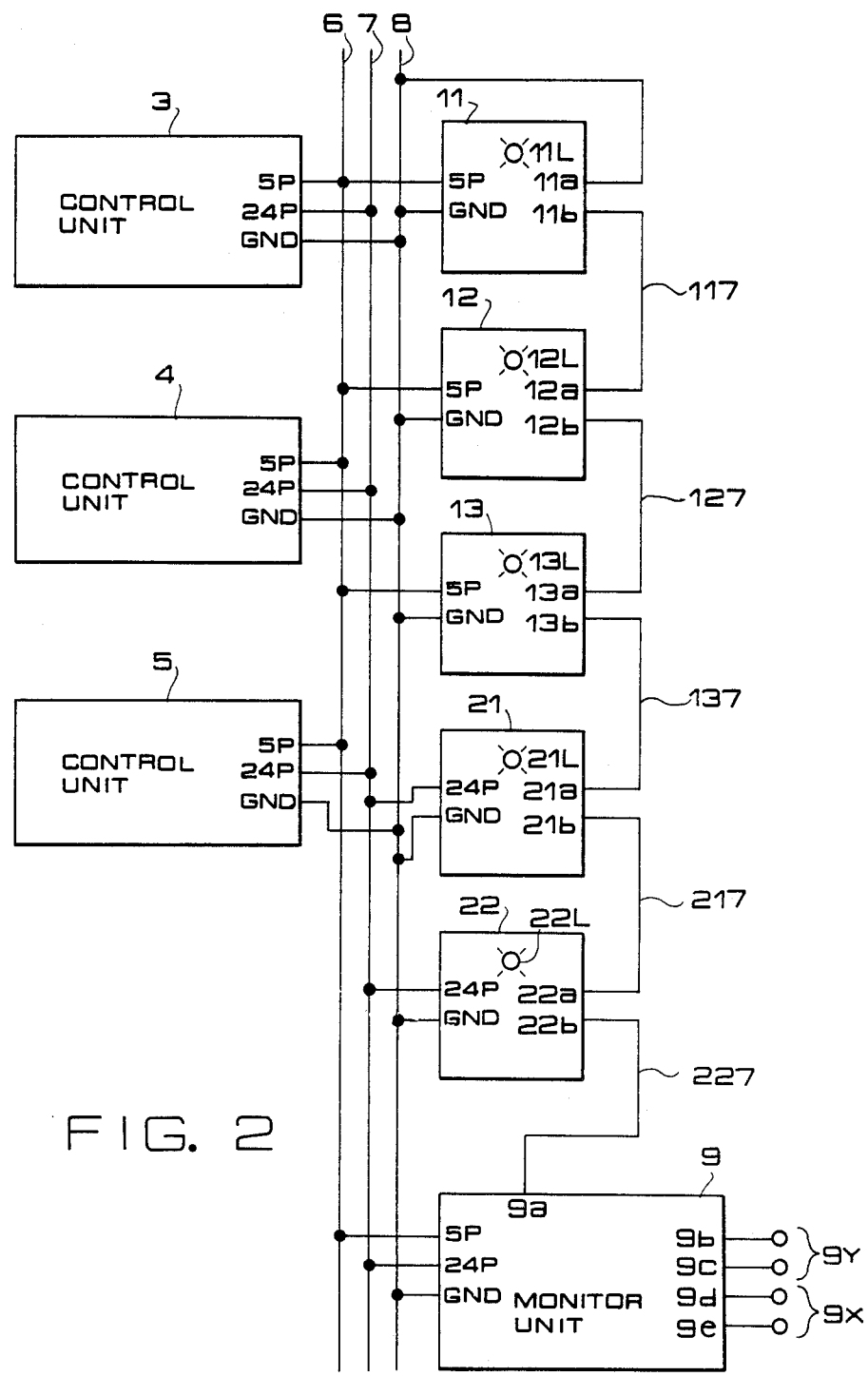
FIG. 2 is a block diagram showing the power system according to the present invention.

The present invention will now be described by way of embodiment with reference to the drawings. The system arrangement of FIG. 2 includes control units 3, 4 and 5 within a control system, power units 11, 12 and 13 supplying the 5-volt power voltage to the control units 3, 4 and 5 through a 5-volt bus 6 and 0-volt bus 8, power units 21 and 22 supplying the 24-volt power voltage to the control units through a 24-volt bus 7 and 0-volt bus 8, and a power monitoring unit 9 which checks up the supply voltages on the buses 6, 7 and 8 and provides a signal 9X if they are normal, and also receives signals from the power units via signal lines 117, 127, 137, 217 and 227 and provides a signal 9Y if they are normal.

Figure 3:
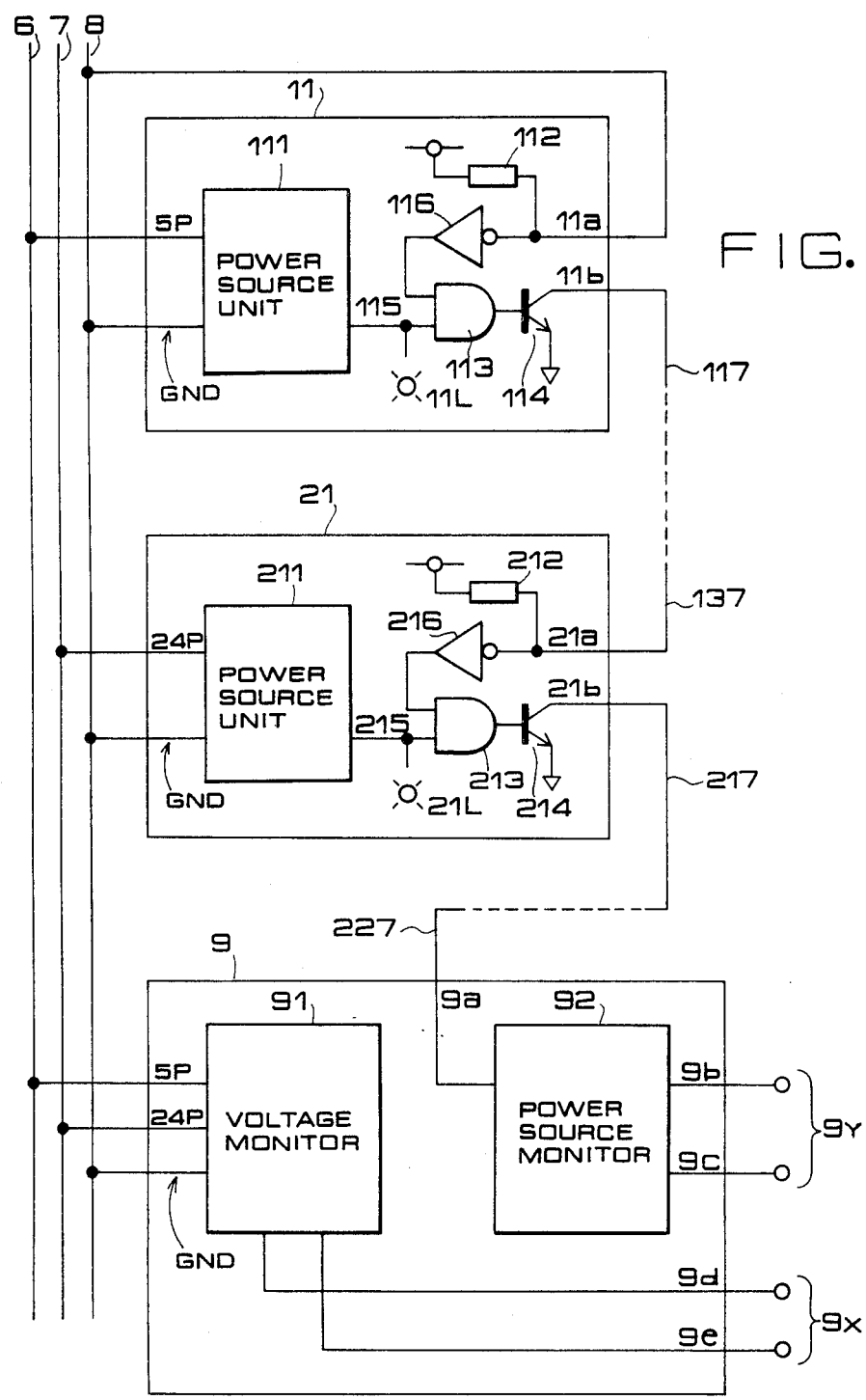
FIG. 3 is a block diagram showing in detail two of the power units and the power monitoring unit shown in FIG. 2.

FIG. 3 shows in detail the power units 11 and 21, and the power monitoring unit 9. The power unit 11 incorporates a power source module 111 providing the 5-volt power voltage across its 5-volt terminal (5P) and 0-volt terminal (GND), and has an AND gate 113 which receives at its one input a normality signal 115 which is issued by the power unit 111 when it operates normally, and an indicator lamp 11L which lights up in response to the normality signal 115. The AND gate 113 has another input connected to the output of an inverter (NOT) 116 with its input connected through a pull-up resistor 112 to the positive output of the power source module and also connected to a terminal 11a which is connected to the GND bus 8. The output of the AND gate 113 is connected to the base of a transistor 114 for providing open-collector output, and its collector is connected to a terminal 11b. Similarly, the power unit 21 includes a power source module 211, a pull-up resistor 212, an AND gate 213, a transistor 214, an inverter 216, and a lamp 21L, and in this case the input of the inverter 216 is connected to the collector of transistor 114 within the power unit 11 in linkage through its terminal 11b.

The power monitoring unit 9 consists of a voltage monitoring circuit 91 which checks up the voltages on the buses 6, 7 and 8 and provides the normality signal 9X on terminals 9d and 9e when all voltages are normal, and a power unit monitoring circuit 92 which receives a signal at terminal 9a and provides a normality signal 9Y on terminals 9b and 9c when all transistors in the power units 11, 12, 13, 21, and 22 are conductive.

The 5-volt power consumed by the control units 3, 4 and 5 in the control system is sufficed by arbitrary two of the three 5-volt power units 11, 12 and 13, and one of the units is redundant. By the same reason, one of the two 24-volt power units 21 and 22 is redundant.

The following describes the operation of the circuit arrangement shown in FIG. 3. When the 5-volt power unit 11 operates normally, the power source module 111 provides a high level signal 115, causing the indicator lamp 11L to light. The 0-volt level on the 0-volt bus 8 causes the inverter 116 to provide a high output, and thus the AND gate 113 to provide a high level, bringing the transistor 114 into a conductive state. If the same operation takes place in the remaining power units 12, 13, 21, and 22, a low level signal will appear at a terminal 9a of the power monitoring unit 9, and the power unit monitoring circuit 92 detects it to provide the normality signal 9Y. The voltage monitoring circuit 91 detects the specified voltages on the buses 6, 7 and 8, and provides the normality signal 9X.

Assuming now that a fault has occurred in one of the 5-volt power units 11, 12 and 13, e.g., the power source module 111 in the unit 11 has failed, the signal 115 goes low, causing the indicator lamp 11L to go off and the transistor 114 to be cut off. This gives a high level to the input of the inverter in the adjacent power units, turning its output low and the associated transistor to a cutoff state. This operation is propagated to the following power units, and finally the terminal 9a goes high to disable the output of the normality signal 9Y. The above-mentioned operation takes place equally for the failure of any power unit, and the occurrence of fault in at least one power unit can be known from the absence of the normality signal 9Y and the faulty power unit can be identified immediately by the operator by checking the indicator lamps 11L-22L.

Moreover, in case only one of the 5-volt power units 11, 12 and 13, and/or only one of the 24-volt power units 21 and 22 has failed, power necessary for the operation of the control units 3, 4 and 5 is sufficed by the outputs of the remaining normal power units, allowing the repair or replacement of the faulty power unit without interrupting the operation of the control system.

Figure 1:
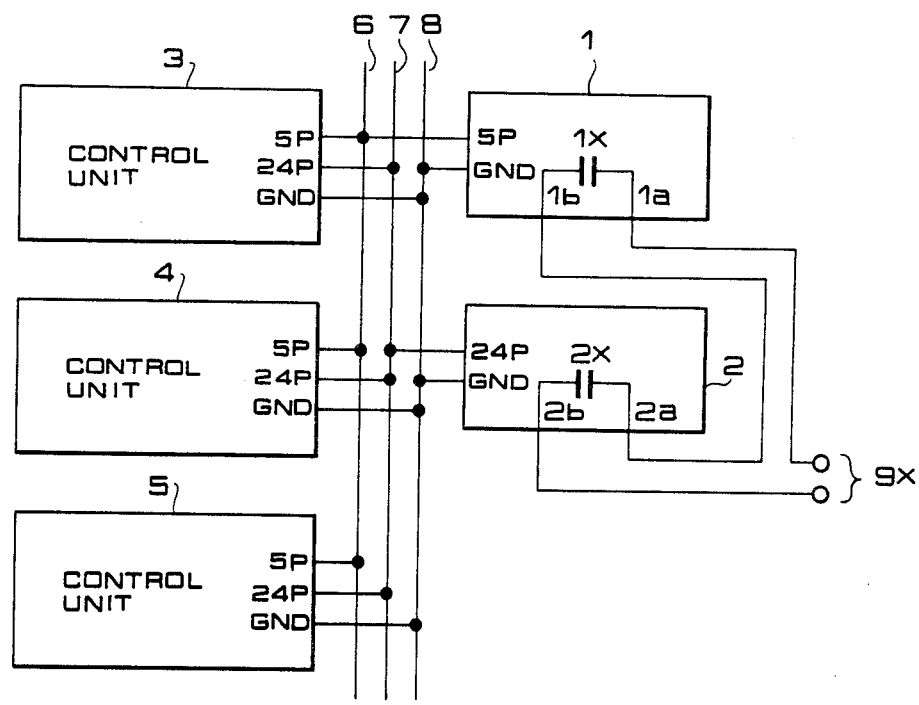
FIG. 1 is a block diagram showing the conventional power system.

Although in the above embodiment the power units supply 5 volts and 24 volts, the output voltages may be different from these, and the number of power units and loading units is not limited to that of the embodiment. In addition, the transistors used to indicate the normality of the power units may be replaced with contacts as shown in FIG. 1.

According to the present invention, as described above, a plurality of power units each having a capacity smaller than the load are connected in parallel so that at least one power unit is redundant, whereby the power system can meet any load condition merely by adjusting the number of power units and, at the same time, in the event of failure in one power unit it can be repaired or replaced without interrupting the load operation, and a highly reliable and yet low cost power system can be constructed.

What is claimed is:

1. A power system comprising a plurality of power units connected to a common bus for supplying power to a load and having a total capacity larger than a maximum power consumption of said load by at least the amount of one of said power units, each of said power units having a capacity smaller than said maximum power consumption of said load and comprises a power source means which provides a specified voltage output to said bus and issues a normality signal when said power unit operates normally; and a power monitoring circuit comprising a voltage monitoring circuit which checks up the voltage on said bus and issues a first normal signal when the voltage is normal, and a power unit monitoring circuit which detects that all of said power source means are operating and provides a second normal signal.

2. A power system according to claim 1, wherein each of said power units includes an inverter (logical NOT circuit), a pull-up resistor for bringing the input terminal of said inverter to a specified voltage level, a logical AND gate receiving as inputs thereof the output of said inverter and the normality signal from said power source means, and a transistor which is controlled by the output of said AND gate, said transistor being connected such that an inverter of an adjacent power unit receives at the input terminal thereof a low voltage level when said transistor is conductive.

3. A power system according to claim 1, wherein said load comprises a control unit of a control system.

* * * * *